J. WAHN.
GROUND DETECTOR FOR INSULATORS.
APPLICATION FILED FEB. 2, 1912.
1,095,439.
Patented May 5, 1914.
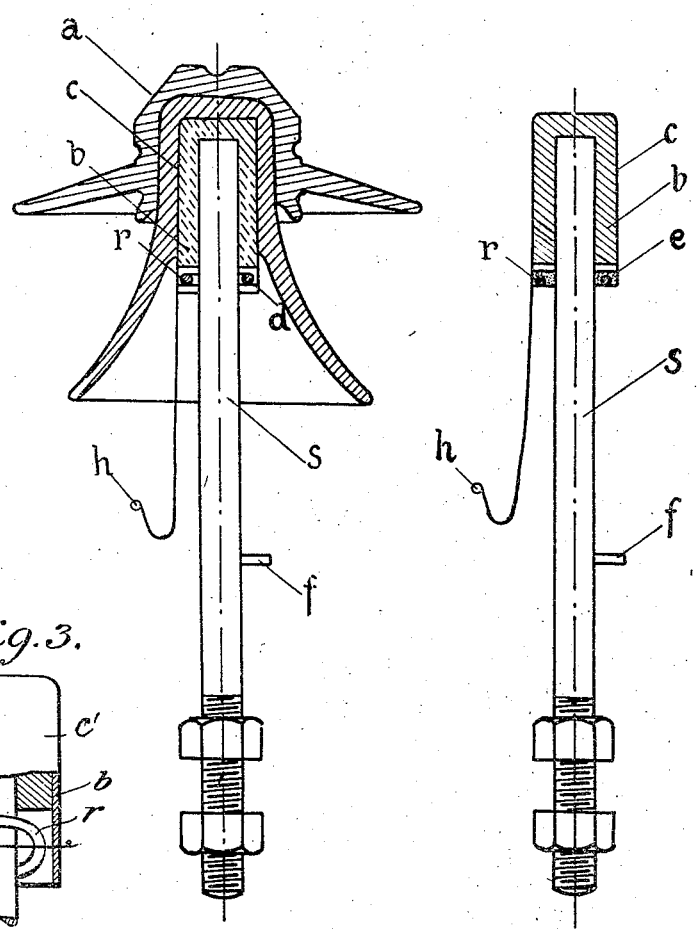
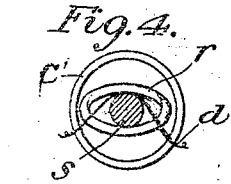
Witnesses:
Inventor:
Josef Wahn
by F. Singer
Attorney

UNITED STATES PATENT OFFICE.

JOSEF WAHN, OF VIENNA, AUSTRIA-HUNGARY.

GROUND-DETECTOR FOR INSULATORS.

1,095,439.

Specification of Letters Patent.

Patented May 5, 1914.

Application filed February 2, 1912. Serial No. 674,932.

*To all whom it may concern:*

Be it known that I, Dr. JOSEF WAHN, engineer, subject of the Emperor of Austria-Hungary, residing at 47 Zirkusgasse, Vienna II, Austria-Hungary, have invented certain new and useful Improvements in Ground-Detectors for Insulators, of which the following is a specification.

It is the object of the present invention to provide an insulator and ground detector permitting the testing of the same by means of the normal working current without disconnecting the insulator from the circuit. With this end in view a conductor (for instance a thin metal sleeve or cap) is embedded into the insulating material in such a manner that two distinct insulators are created, a main insulator and a secondary insulator separated by the conductor. By means of this construction leakage currents can be led from the conductor through measuring instruments or other devices hereinafter more fully described. The secondary insulation serves as a high resistance in parallel with the measuring instrument or other device. This resistance is so high that practically all of the leakage current is available for measurement or for operation of the automatic devices referred to later.

In the accompanying drawing: Figure 1 is a cross section of an insulator and ground detector according to the present invention, and Fig. 2 shows a modified form of an insulator carrier or pin with the secondary insulator and the conductor (a metal sleeve or cap). Fig. 3 shows the pin head partly in section illustrating the location of the fusible wire, and Fig. 4 is a cross section through the same seen in the direction of the arrow, Fig. 3.

$a$ is the main insulator, $b$ the secondary insulator, $c$ the conductor, for instance a thin metal sleeve or cap, $h$ is an extension conductor electrically connected with said main conductor for the purpose of affording connecting means for a measuring instrument, $s$ is the carrier or pin for the insulator.

According to Fig. 1 of the drawing the devices for automatically indicating any defects of the insulator are conveniently arranged between the conductor $c$ and the pin $s$ and consist chiefly of a wire $d$ of fusible metal connecting the metallic cap $c$ electrically with the pin $s$. The two ends of the wire $d$ are fastened in the wall of the cap $c$ and the metal part of the wire is in contact with the pin $s$. The ring $r$ is made of non-fusible material and rests upon the wire $d$. As long as the wire $d$ connects the parts $c$ and $s$ the secondary insulator $d$ does not act as a resistance for the reason that the currents coming from the main insulator to the metallic layer $c$ flow through the wire $d$ to the pin $s$. If the currents become so strong that they melt the wire $d$ they are interrupted and the secondary insulation $b$ becomes active. At the same time the ring $r$ has lost its support and drops down. Now the defect of the main insulator is detected and when now the hook $h$ and the pin $s$ are connected with the pole wires of a measuring instrument, it is easily possible to measure the loss of current. The measuring is effected in such a manner that the secondary insulator acts as a large resistance shunted with the resistance of the instrument.

In the construction according to Fig. 2 of the drawing the fuse wire is replaced by an easily melting conducting mass $e$ in which the ring $r$ is embedded. The mass $e$ connects the part $c$ electrically with the pin $s$ and has the ring $r$ embedded in it. If the current becomes so strong that the heat generated, causes the melting of the mass $e$, the ring is freed and drops down.

I claim:

1. An insulator and ground detector comprising in combination, a main insulator seated upon the customary pin, a secondary insulator between said main insulator and said pin, a conductor separating both insulators, fusible means secured to said conductor and contacting with said pin, for conductively connecting both, and means for connecting the said conductor with the pole wires of a measuring instrument for indicating the presence of a leakage current, substantially as described.

2. An insulator and ground detector comprising in combination, a main insulator seated upon the customary pin, a secondary insulator between said main insulator and said pin, a conductor separating both insulators, a fusible wire secured with its ends to said conductor and contacting with said pin for conductively connecting both, a non-fusible ring resting upon said fusible wire and dropping upon the melting of the same by a leakage current, and a pin upon the carrier pin for the insulator adapted to catch said ring for visibly and mechanically indicating the presence of a leakage current, substantially as described.

In testimony whereof I affix my signature in presence of two witnesses.

Dr. JOSEF WAHN.

Witnesses:
WILHELM OTTO KOPPRASCH,
AUGUST FUGGER.